(12) United States Patent
Kim et al.

(10) Patent No.: US 9,727,086 B2
(45) Date of Patent: Aug. 8, 2017

(54) ELECTRONIC DEVICE CAPABLE OF MAINTAINING CONTACT OF BATTERY WITH POWER TERMINAL

(71) Applicant: Samsung Electronics Co., Ltd., Suwon-si, Gyeonggi-do (KR)

(72) Inventors: Hoonjae Kim, Gumi-si (KR); Byunggil Kwak, Gumi-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 25 days.

(21) Appl. No.: 14/789,508

(22) Filed: Jul. 1, 2015

(65) Prior Publication Data
US 2016/0057876 A1    Feb. 25, 2016

(30) Foreign Application Priority Data

Aug. 21, 2014  (KR) ........................ 10-2014-0108955

(51) Int. Cl.
| | | |
|---|---|---|
| *G06F 1/16* | (2006.01) | |
| *H04M 1/02* | (2006.01) | |
| *H04B 1/3883* | (2015.01) | |
| *H01M 2/10* | (2006.01) | |

(52) U.S. Cl.
CPC ........ *G06F 1/1635* (2013.01); *H04M 1/0262* (2013.01); *H01M 2/1066* (2013.01); *H01M 2220/30* (2013.01); *H04B 1/3883* (2013.01)

(58) Field of Classification Search
CPC . G06F 1/1635; H01M 2/1066; H01M 2/1022; H01M 2/30; H01M 2220/30; H04M 1/0262; H04B 1/3883
See application file for complete search history.

(56) References Cited

U.S. PATENT DOCUMENTS

| | | | | |
|---|---|---|---|---|
| 5,933,330 | A * | 8/1999 | Beutler | H01M 2/1022 320/114 |
| 6,450,844 | B1 * | 9/2002 | Mizumura | H01R 12/57 439/342 |
| 6,515,450 | B1 * | 2/2003 | Kaiho | H01M 2/1022 320/112 |
| 7,346,366 | B2 * | 3/2008 | Park | H04M 1/0262 455/550.1 |
| 8,934,220 | B2 | 1/2015 | Miyamatsu et al. | |
| 2006/0063064 | A1 * | 3/2006 | Ishihara | H01M 2/1066 429/98 |

(Continued)

FOREIGN PATENT DOCUMENTS

| | | |
|---|---|---|
| JP | 5409573 B9 | 2/2014 |
| KR | 10-0572474 B1 | 4/2006 |

*Primary Examiner* — Adrian S Wilson
*Assistant Examiner* — Abhishek Rathod
(74) *Attorney, Agent, or Firm* — Jefferson IP Law, LLP (57) ABSTRACT

An electronic device having a mechanical structure that prevents a contact failure in an electronic device having a contact structure between a battery and a power terminal is provided. The electronic device includes a case including a battery mounting part, in which a battery is mounted, a terminal part formed on a first side wall of the battery mounting part to provide an elastic force directed to a second side wall opposite to the first side wall, to the battery, and a tension part formed on the second side wall of the battery mounting part to provide an elastic force directed toward the first side wall.

10 Claims, 6 Drawing Sheets

(56) References Cited

U.S. PATENT DOCUMENTS

| | | | |
|---|---|---|---|
| 2008/0100262 A1* | 5/2008 | Ozaki | H01M 2/1066 320/112 |
| 2009/0169982 A1* | 7/2009 | Goto | G06F 1/1616 429/100 |
| 2010/0099016 A1* | 4/2010 | Chu | H01M 2/1066 429/97 |
| 2011/0033740 A1* | 2/2011 | Zhang | G06F 1/1635 429/100 |
| 2012/0262851 A1* | 10/2012 | Ke | G06F 1/1616 361/679.01 |

* cited by examiner

ELECTRONIC DEVICE CAPABLE OF MAINTAINING CONTACT OF BATTERY WITH POWER TERMINAL

CROSS-REFERENCE TO RELATED APPLICATION(S)

This application claims the benefit under 35 U.S.C. §119 (a) of a Korean patent application filed on Aug. 21, 2014 in the Korean Intellectual Property Office and assigned Serial number 10-2014-0108955, the entire disclosure of which is hereby incorporated by reference.

TECHNICAL FIELD

The present disclosure relates to a mechanical structure. More particularly, the present disclosure relates to a mechanical structure in an electronic device having a contact structure between a power terminal and a battery, maintains a contact between the power terminal and the battery to prevent a contact failure between the power terminal and the battery.

BACKGROUND

A battery mounting method used in an electronic device, such as a portable terminal device, includes a method of mounting a battery to be exposed to the outside without using a battery cover and a method of mounting a battery in which a battery cover is used.

The method of mounting the battery to be exposed to the outside is a method, in which the battery is mounted while being slid along a guide formed in a battery mounting part of the portable terminal device. Another method of mounting the battery is a method, in which an end of the battery is supported by a holding step formed on one side edge of the battery mounting part, and the remaining portion of the battery is inserted into the battery mounting part in a direction perpendicular to the battery mounting part to be mounted in the battery mounting part.

The method of using the battery cover is a method, in which one end of the battery is supported by a holding step formed at one side edge of the battery, the remaining portion of the battery is inserted into the battery mounting part in a direction perpendicular to the battery mounting part to be mounted in the battery mounting, and after the battery is mounted, the battery cover is positioned onto the electronic device to prevent the battery from being exposed to the outside.

The above information is presented as background information only to assist with an understanding of the present disclosure. No determination has been made, and no assertion is made, as to whether any of the above might be applicable as prior art with regard to the present disclosure.

SUMMARY

An electronic device of the related art including a detachable/attachable battery should be designed to have a battery seating structure capable of maintaining the battery and the power terminal in a mutually stable contacted state, and allowing the user to easily detach/attach the battery while preventing the movement of the battery, according to the related art.

For this purpose, a battery seating structure of the related art includes mechanical parts, such as a protrusion and a rib formed on a part of one side of the battery mounting part to reduce a gap formed between a seating recess at a power terminal side at the other side of the mechanical parts and the battery as much as possible such that even if the battery is pushed from the power terminal, the battery can be supported to minimize a contact failure of the battery, thereby preventing a battery failure.

However, when the mechanical parts, such as the projection and the rib, are designed to have an increased length to reduce the gap, the battery may be damaged due to the reduced gap and the attachment/detachment of the battery becomes difficult.

On the contrary, when the mechanical parts are designed to have a reduced length, the battery may be easily separated from the power terminal or a contact failure occurs that disrupts the supply of power to the electronic device.

Even if the battery seating structure is designed and fabricated in consideration of the above-described problems, there are problems in that it is not easy to control the sizes in manufacture and assembly, and the corresponding parts should be frequently corrected.

Furthermore, when the detachment/attachment of the battery is repeated, the elastic force of the contact part decreases. That is, the elastic force of the contact part decreases so that the contact part cannot come in contact with the battery.

Aspects of the present disclosure are to address at least the above-mentioned problems described and/or disadvantages and to provide at least the advantages described below. Accordingly, and an aspect of the present disclosure is to provide an electronic device having a mechanical structure that prevents a contact failure in an electronic device having a contact structure between a battery and a power terminal.

Another aspect of the present disclosure is to provide an electronic device capable of adjusting a gap between a battery and a power terminal to stably maintain a battery contact.

In accordance with an aspect of the present disclosure, an electronic device is provided. The electronic device includes a case including a battery mounting part, in which a battery is mounted, a terminal part formed on a first side wall of the battery mounting part to provide an elastic force directed to a second side wall opposite to the first side wall, to the battery, and a tension part formed on the second side wall of the battery mounting part to provide an elastic force directed toward the first side wall.

The tension part includes a recessed seating part formed on the second side wall of the battery mounting part, and a contact piece protruding in a cantilever shape from a side of the seating part, the contact piece being in contact with the battery to provide an elastic force to the battery.

The case includes a first frame and a second frame, the first frame includes the seating part and the second frame includes the contact piece, and a U-shaped tension recess is formed in a boundary where the contact piece and the first frame are connected with each other.

The electronic device includes an elastic member positioned between the contact piece and the seating part.

The contact piece includes a projection in an area facing the battery, the projection being in contact with the battery.

In accordance with another aspect of the present disclosure, an electronic device is provided. The electronic device includes a case including a battery mounting part, in which a battery is mounted, a terminal part formed on a first side wall of the battery mounting part, a tension part formed on the second side wall of the battery mounting part, and a compression part configured to continuously apply a force toward a contact, wherein the terminal part and the tension part compress the battery on the first and second side walls of the battery mounting part.

The compression part includes a recessed seating part formed on the second side wall of the battery mounting part, a contact piece formed to cover an opened region of the seating part, and a projection positioned in a region facing the battery, the projection protruding further than a gap between the seating part and the contact piece which is narrowed when the contact piece is bent to the seating part to be in contact with the battery while applying the force toward the contact.

The electronic device includes an elastic member positioned between the contact piece and the seating part to reinforce the elastic force for the battery mounting part.

The elastic member may adjust a bent portion of the contact piece.

The tension recesses may be formed at opposite sides of the contact piece, respectively, and the tension recesses are formed in a listing structure.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
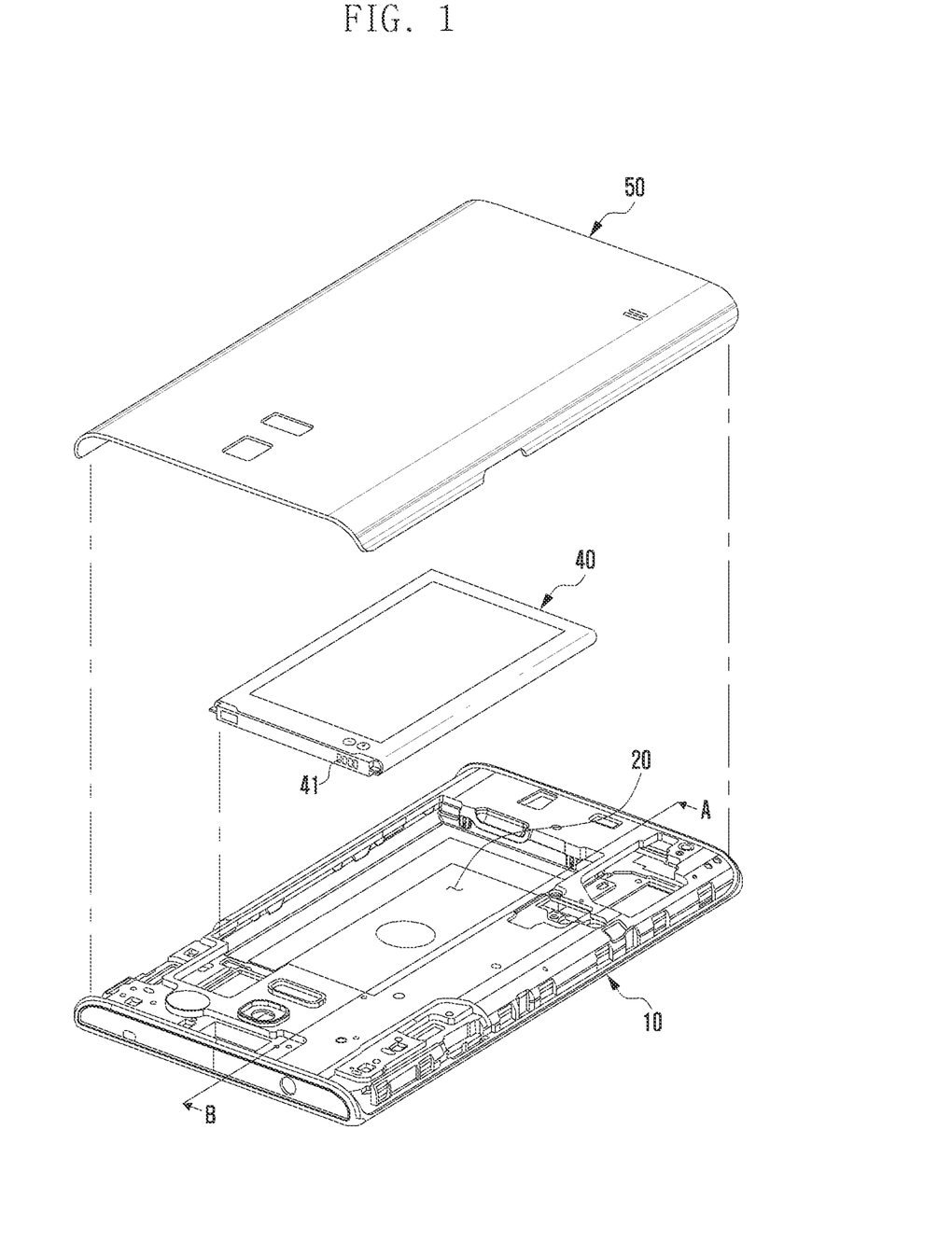
FIG. 1 is an exploded perspective view illustrating an electronic device according to an embodiment of the present disclosure.

FIG. 1 is an exploded perspective view illustrating an electronic device according to an embodiment of the present disclosure.

Figure 2:
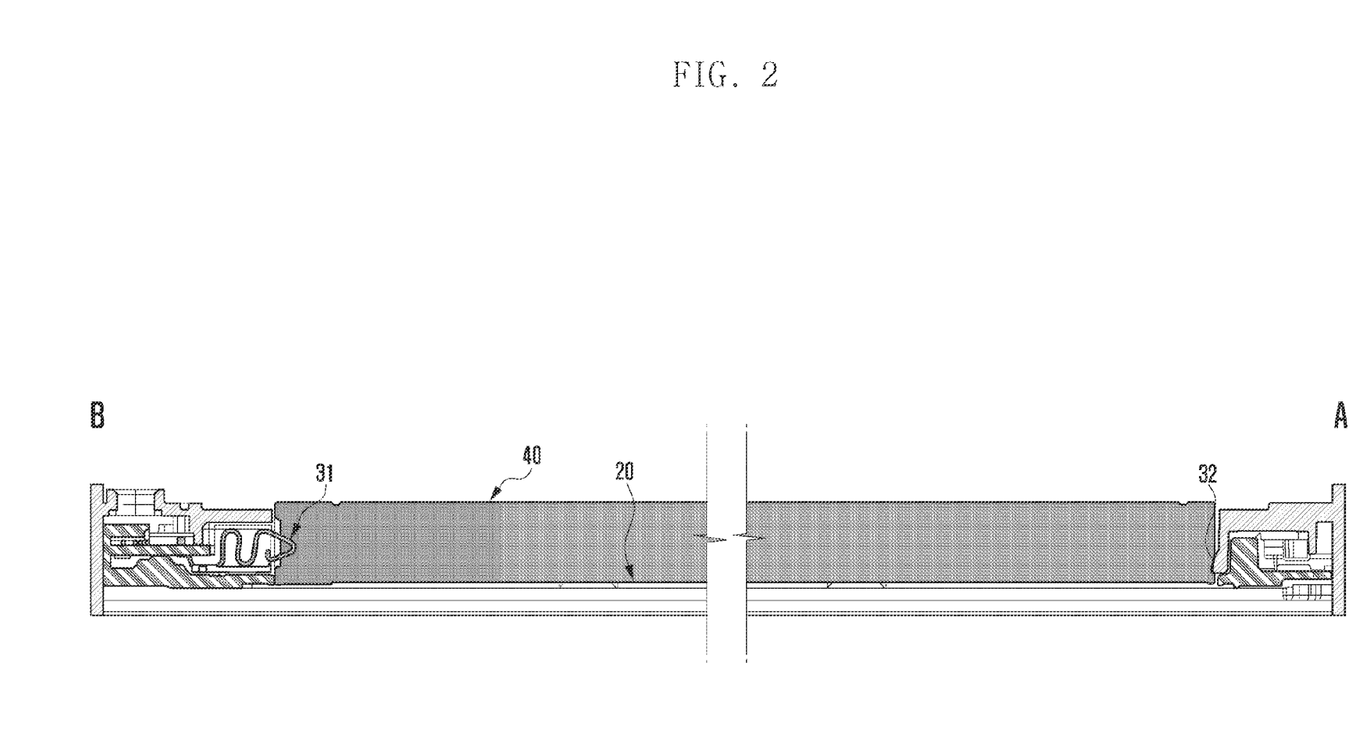
FIG. 2 is a cross-sectional view taken along line A-B in FIG. 1 according to an embodiment of the present disclosure.

FIG. 2 is a cross-sectional view taken along line A-B in FIG. 1 according to an embodiment of the present disclosure.

Referring to FIG. 1, an electronic device includes a case 10 configured to mount electronic components therein, a battery 40 mounted in a battery mounting part 20 in the case 10, and a battery cover 50 coupled to one face of the case 10 to prevent the battery 40 from being exposed to the outside of the electronic device.

As the functions of the electronic device are diversified, the battery 40 may be configured as an exchangeable type to be capable of being attached/detached in order to handle the high power consumption.

The exchangeable battery 40 is configured to be capable of being detached from/attached to the electronic device by the user. On the surface of the case 10, a battery mounting part 20 having a shape corresponding to that of the battery 40 may be formed so that the battery 40 can be mounted in the battery mounting part 20.

The battery mounting part 20 may be provided with a terminal part 31 to be electrically connected to the electric components mounted within the case.

Referring to FIG. 2, the terminal part 31 is formed on a first side wall of the battery mounting part 20. The terminal part 31 provides an elastic force to the battery, in which the elastic force is applied in a direction toward a second side wall opposite to the first side wall of the battery mounting part 20.

The terminal part 31 may protrude from the first side wall of the battery mounting part 20. The terminal part 31 may protrude from the one side of the battery mounting part 20, which corresponds to a side face of the battery 40, so as to elastically compress the side face of the battery 40.

The one battery mounting part 20 may any one of a plurality of side walls formed along the inner periphery of the battery mounting part 20, and the second side wall may be a side wall positioned opposite to the first side wall. FIGS. 1 and 2 illustrate the first side wall as the side wall formed adjacent to the "B" region and the second side wall as the side wall formed adjacent to the "A" region.

When the battery 40 is mounted in the battery mounting part 20, the terminal part 31 is introduced into the inside of the case 10.

The terminal part 31 may apply an elastic force to the battery 40 side to be in contact with the contact terminal 41 of the battery 40.

At one side of the battery 40, a contact terminal 41 to come in contact with the terminal part 31 is exposed. The contact terminal 41 delivers the power stored in the battery 40 to the electronic device through the terminal part 31 to be used for driving the electronic device.

A tension part 32 may be formed on the second side wall of the battery mounting part 20. The tension part 32 provides an elastic force in a direction from the second side wall of the battery mounting part 20 toward the first side wall of the battery mounting part 20. In the state where the battery 40 is installed in the battery mounting part 20, the battery 40 pushes the tension part 32. In the state where the battery 40 pushes the tension part 32, the tension part 32 has an elastic force biasing the battery 40.

In the state where the battery 40 is installed in the battery mounting part 20, the terminal part 31 and the tension part 32 are capable of compressing the battery 40 onto the opposite side walls of the battery mounting part 20 to prevent the battery 40 from being unintentionally released from the battery mounting part 20.

Figure 3:
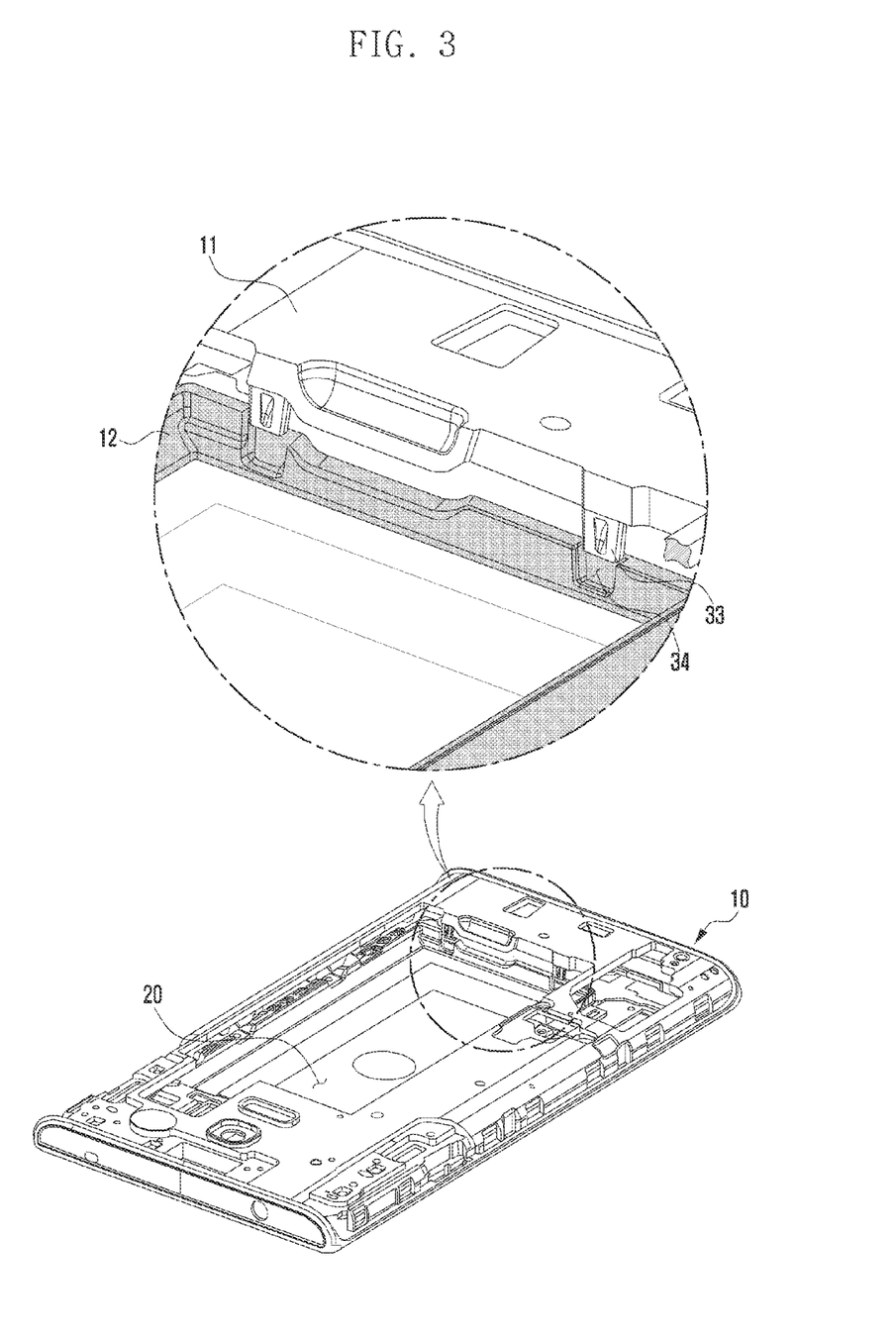
FIG. 3 is a perspective view of a case according to an embodiment of the present disclosure.

FIG. 3 is a perspective view illustrating a case 10 according to an embodiment of the present disclosure.

Referring to FIG. 3, the tension part 32 includes a recessed seating part 34 formed on the second side wall of the battery mounting part 20 and a contact piece 33 protruding in the form of a cantilever from one side of the seating part 34.

The contact piece 33 comes in contact with the battery 40 so as to provide an elastic force to the battery 40. The contact piece 33 is inserted into an area of the seating part 34 of the seating part 34 in the form of the cantilever. In addition, the contact piece 33 may be formed in a structure that covers an opened region of the seating part 34.

When a force is applied to the contact piece 33, the contact piece 33 may be bent toward the inner recess region of the seating part 34. In order to adjust the bent portion of the contact piece 33, the recess of the seating part 34 may have a proper depth.

The case 10 may include a first frame 11 and a second frame 12. The first frame 11 and the second frame 12 may form an external appearance of the electronic device.

The first frame 11 and the second frame 12 may be injection-molded such that the first frame 11 includes the contact piece 33 and the second frame 12 includes the seating part 34.

Figure 4:
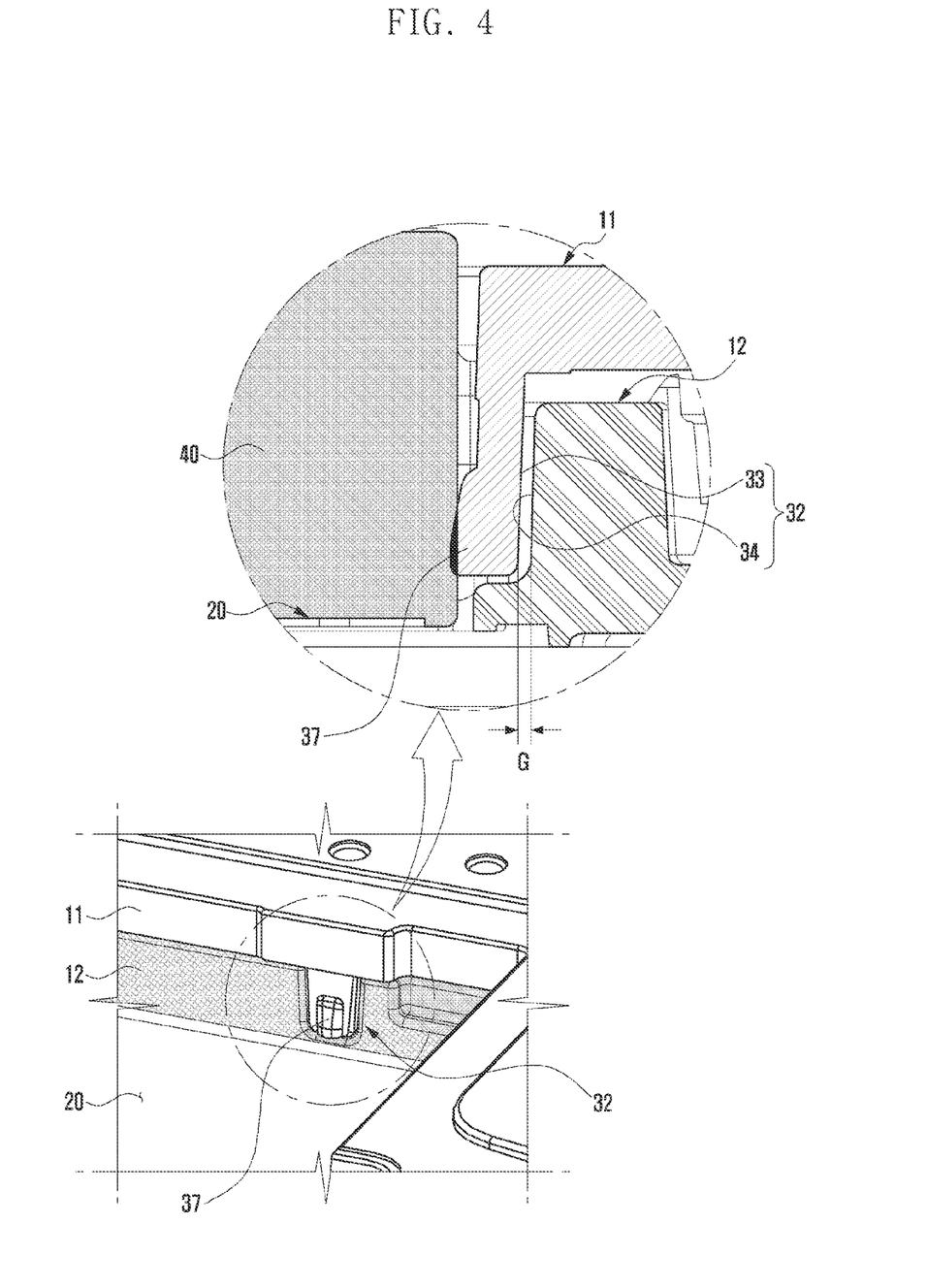
FIG. 4 is a view illustrating a tension part according to an embodiment of the present disclosure.

FIG. 4 is a view illustrating a tension part 32 according to an embodiment of the present disclosure.

Referring to FIG. 4, the contact piece 33 formed to extend from the first frame 11 may be formed not to come in contact with the seating part 34 formed in the second frame 12. A predetermined gap G may be formed between the contact piece 33 and the seating part 34.

In the state where the battery 40 is installed in the battery mounting part 20, the battery 40 comes in contact with the contact piece 33, and the contact piece 33 is bent to the inside of the seating part 34. In the state where the battery 40 is mounted, the gap G between the contact piece 33 and the seating part 34 is narrowed.

The contact piece 33 may further include a projection 37 positioned in a region facing the battery 40. When the battery 40 is installed in the battery mounting part 20, the projection 37 may come in contact with the battery 40.

The projection 37 may overlappingly protrude toward the battery 40. That is, as the battery 40 is installed in the battery mounting part 20, the contact piece 33 protrudes in a gap larger than the gap narrowed by being bent to the seating part 34 so that even if the gap G is narrowed, the contact piece 33 can continuously apply the force in the contact direction, thereby preventing the contact failure.

By adjusting the portion of the projection 37 that overlappingly protrudes, it is possible to prevent the contact failure according to the occurrence of a tolerance between a charging terminal and the mechanical parts.

When the battery 40 is repeatedly detached from/attached to the battery mounting part 20, a part where the projection 37 and the battery 40 are in contact with each other may become worn out. Even if the surface of the projection 37 is worn out, the projection 37 and the battery 40 may be in contact with each other, and at the same time, the contact piece 33 may compress the battery 40.

Figure 5:
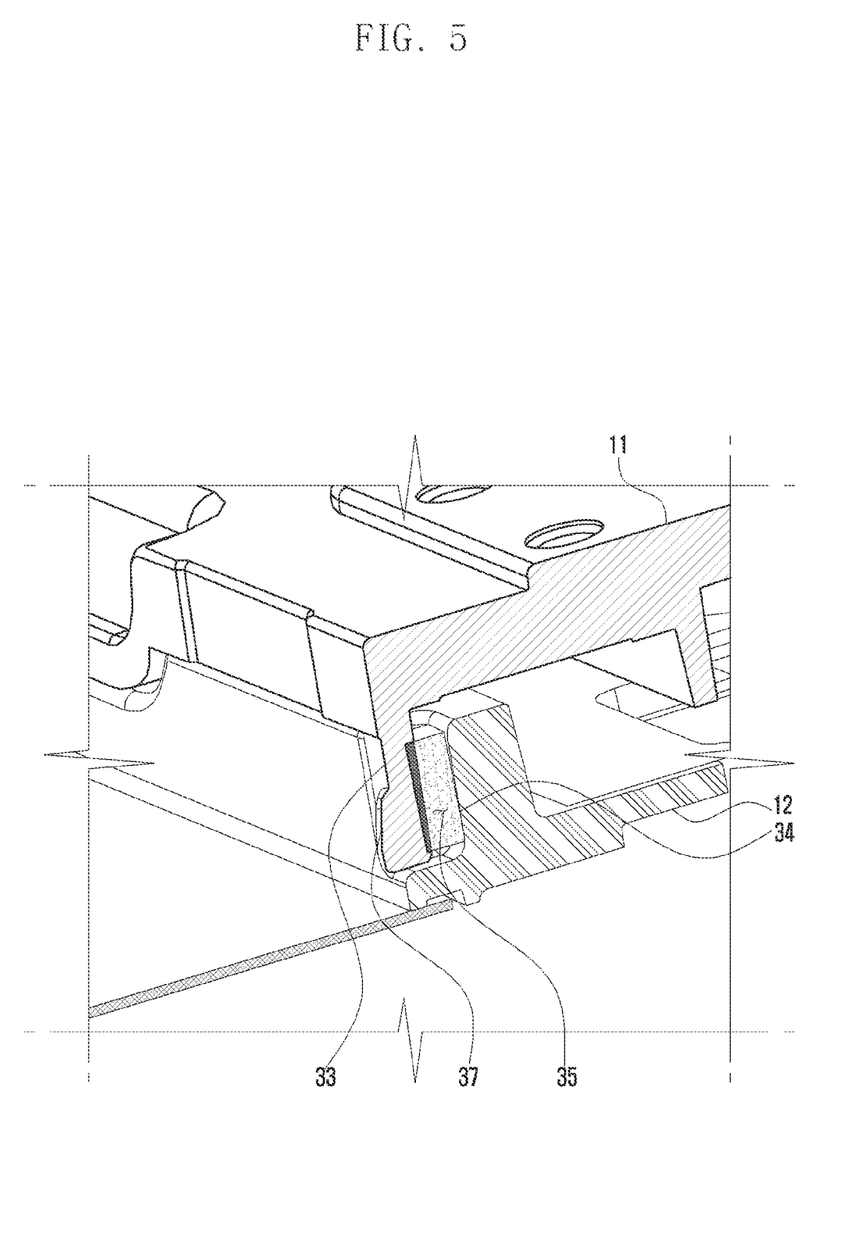
FIG. 5 is a perspective view of the tension part partially in cross-section according to an embodiment of the present disclosure.

FIG. 5 is a cross-sectional view of a tension part 32 according to an embodiment of the present disclosure.

Referring to FIG. 5, an elastic member 35 may be interposed between the contact piece 33 and the seating part 34. The elastic member 35 may be at least one of a sponge, a rubber, and a spring. The elastic member 35 is capable of adjusting a portion pushing the contact piece 33 to the seating part 34.

That is, as the elastic member 35 supports the contact piece 33 including a projection 37 that overlappingly protrudes, a predetermined gap between the contact piece 33 and the seating part 34 can be maintained even if the contact piece 33 is bent to the seating part 34 as much as possible, and the contact piece 33 can be prevented from being damaged by coming in contact with a face of the seating part 34.

Figure 6:
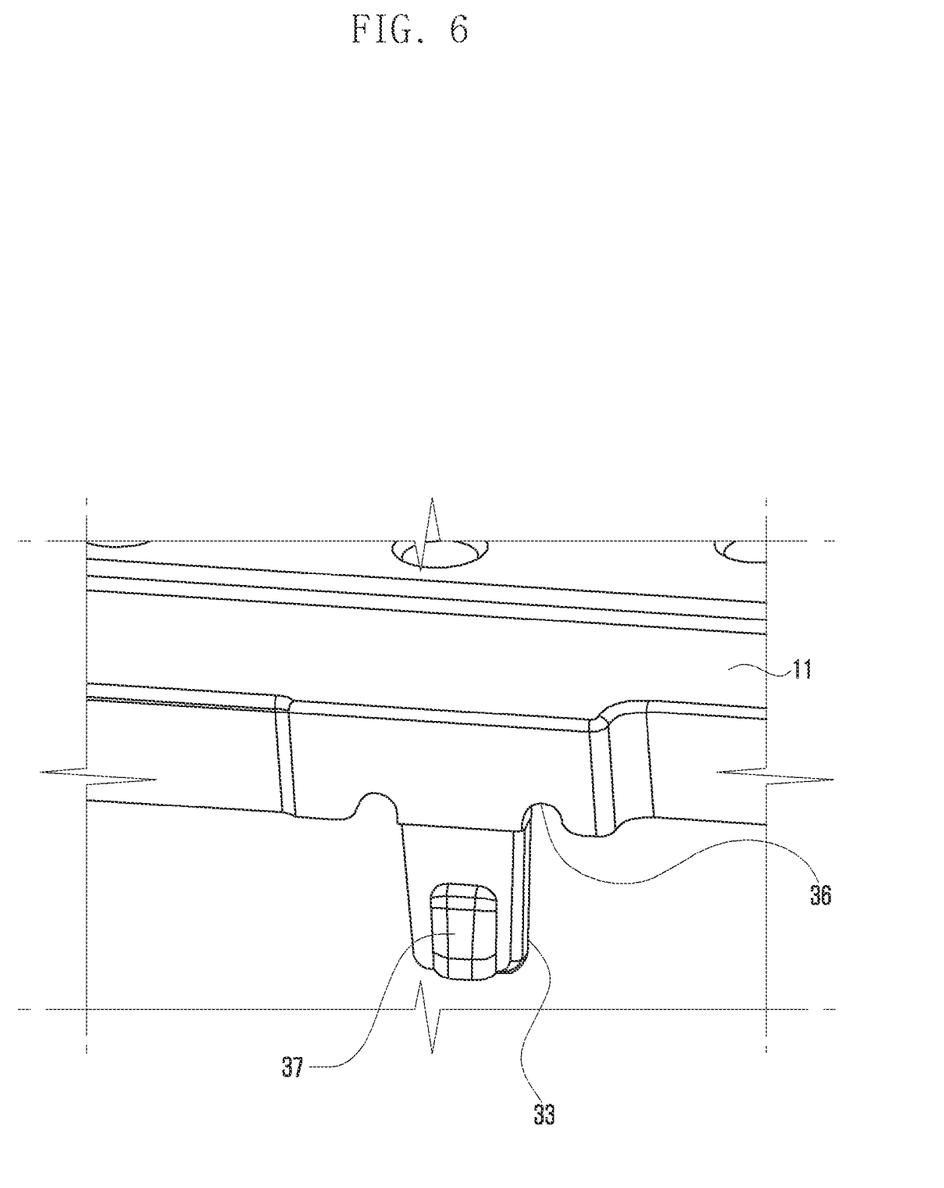
FIG. 6 is a perspective view illustrating the tension part according to an embodiment of the present disclosure.

FIG. 6 is a perspective view illustrating a tension part 32 according to an embodiment of the present disclosure.

Referring to FIG. 6, U-shaped tension recesses 36 may be formed at both sides of the contact piece 33 in a boundary where the contact piece 33 and the first frame 11 are connected with each other.

The tension recesses 36 may be formed in a listing structure by punching a plate-shaped member.

The tension recesses 36 prevent stresses from being concentrated to a portion where the first frame 11 and the contact piece 33 are coupled to each other. The tension recesses 36 allow the contact piece 33 to be stably bent. In addition, the tension recesses 36 are capable of preventing the contact piece 33 from being elastically deformed.

As described above, according to various embodiment of the present disclosure, in the electronic device, as the projection 37 of the injection-molded contact piece 33 overlappingly protrudes, a force can be continuously applied toward the contact so that the contact failure can be mechanically prevented. In addition, an injection elastic force can be secured by the tension recesses 36 formed in a listing structure at the opposite sides of the contact piece 33, and the minimum gap can be secured between the contact piece 33 and the seating part 34 while reinforcing the injection elastic force by the elastic member 35.

According to various embodiments of the present disclosure, in the electronic device, by forming the tension part in the battery mounting part, it is possible to prevent a contact failure that may occur between the battery and the electronic device by a manufacturing tolerance.

In addition, the tension part allows the battery to be mounted in the battery mounting part steadily.

Further, since a force can be continuously applied toward the contact by the contact piece projection of the tension part, a contact failure can be mechanically prevented, an injection elastic force can be secured by the listing structure at the opposite side of the contact piece, and the minimum gap can be secured between the contact piece 33 and the seating part 34 while reinforcing the injection elastic force.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
   a case including a battery mounting part, in which a battery is mounted;
   a terminal part formed on a first side wall of the battery mounting part to provide an elastic force directed to a second side wall opposite to the first side wall, to the battery; and
   a tension part comprising a recessed seating part, a contact piece and an elastic member positioned between the contact piece and the seating part that are formed on the second side wall of the battery mounting part to provide an elastic force directed toward the first side wall,
   wherein the case includes a first frame and a second frame,
   wherein the first frame includes the seating part and the second frame includes the contact piece, and
   wherein a U-shaped tension recess is formed in a boundary where the contact piece and the second frame are connected with each other.

2. The electronic device of claim 1,
   wherein the recessed seating part formed on the second side wall of the battery mounting part,
   wherein the contact piece protrudes in a cantilever shape from a side of the seating part, and
   wherein the contact piece being in contact with the battery to provide an elastic force to the battery.

3. The electronic device of claim 1, wherein the contact piece further includes a projection in an area facing the battery, the projection being in contact with the battery.

4. An electronic device comprising:
   a case including a battery mounting part, in which a battery is mounted;
   a terminal part formed on a first side wall of the battery mounting part; and
   a tension part comprising a recessed seating part and a contact piece provided with a projection positioned in a region facing the battery that are formed on the second side wall of the battery mounting part and configured to continuously apply a force toward a contact of the terminal part,
   wherein the terminal part and the tension part compress the battery on the first and second side walls of the battery mounting part and the projection protrudes further than a gap between the seating part and the contact piece which is narrowed when the contact piece is bent to the seating part to be in contact with the battery while applying the force toward the contact,
   wherein the case includes a first frame and a second frame,
   wherein the first frame includes the seating part and the second frame includes the contact piece, and
   wherein a U-shaped tension recess is formed in a boundary where the contact piece and the second frame are connected with each other.

5. The electronic device of claim 4,
   wherein the recessed seating part formed on the second side wall of the battery mounting part, and
   wherein the contact piece formed to cover an opened region of the seating part.

6. The electronic device of claim 5, wherein tension recesses are formed at opposite sides of the contact piece, respectively, and the tension recesses are formed in a listing structure.

7. The electronic device of claim 5, wherein the tension part further includes an elastic member positioned between the contact piece and the seating part to reinforce the elastic force for the battery mounting part.

8. The electronic device of claim 7, wherein tension recesses are formed at opposite sides of the contact piece, respectively, and the tension recesses are formed in a listing structure.

9. The electronic device of claim 7, wherein the elastic member adjusts a bent portion of the contact piece.

10. The electronic device of claim 9, wherein tension recesses are formed at opposite sides of the contact piece, respectively, and the tension recesses are formed in a listing structure.

* * * * *